UNITED STATES PATENT OFFICE.

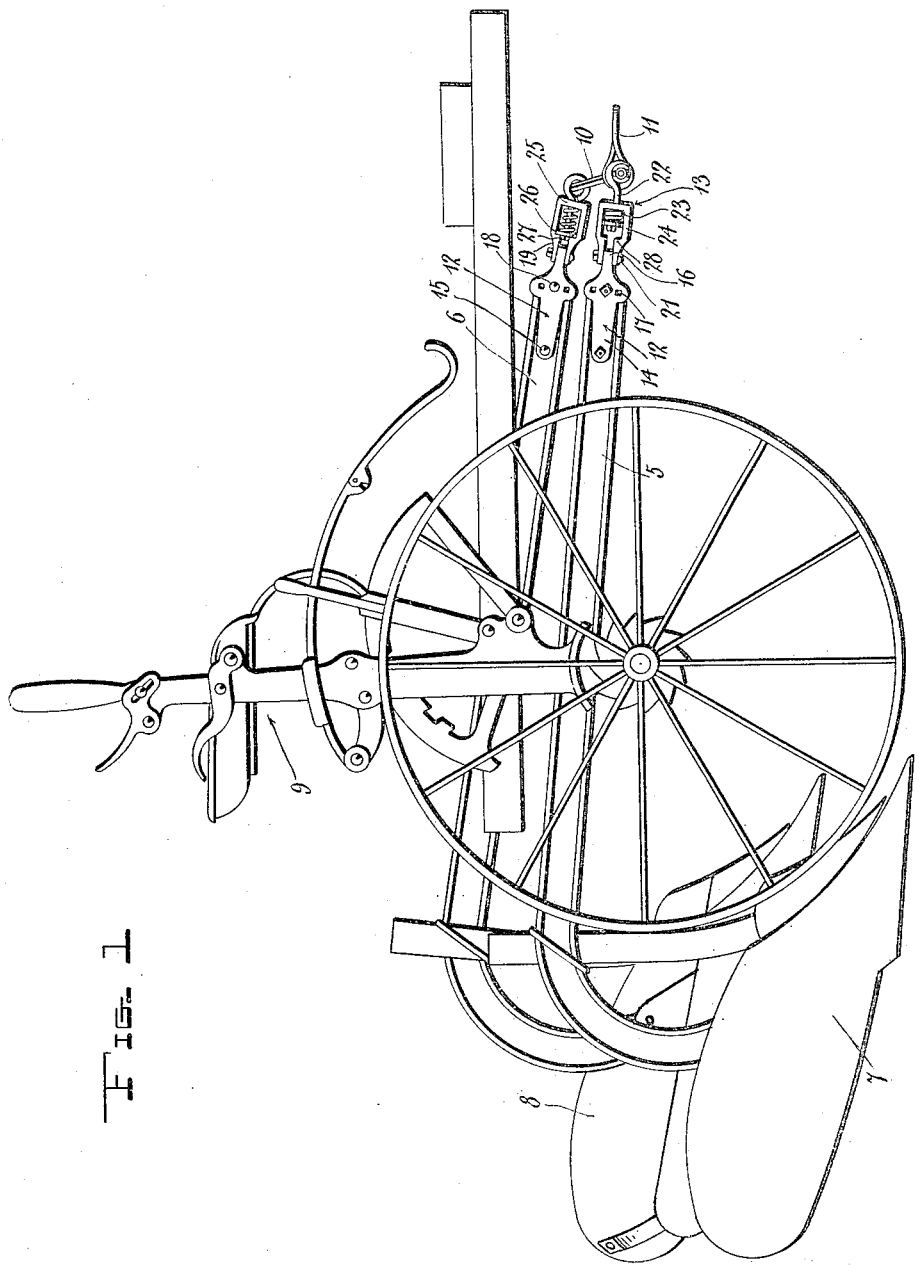

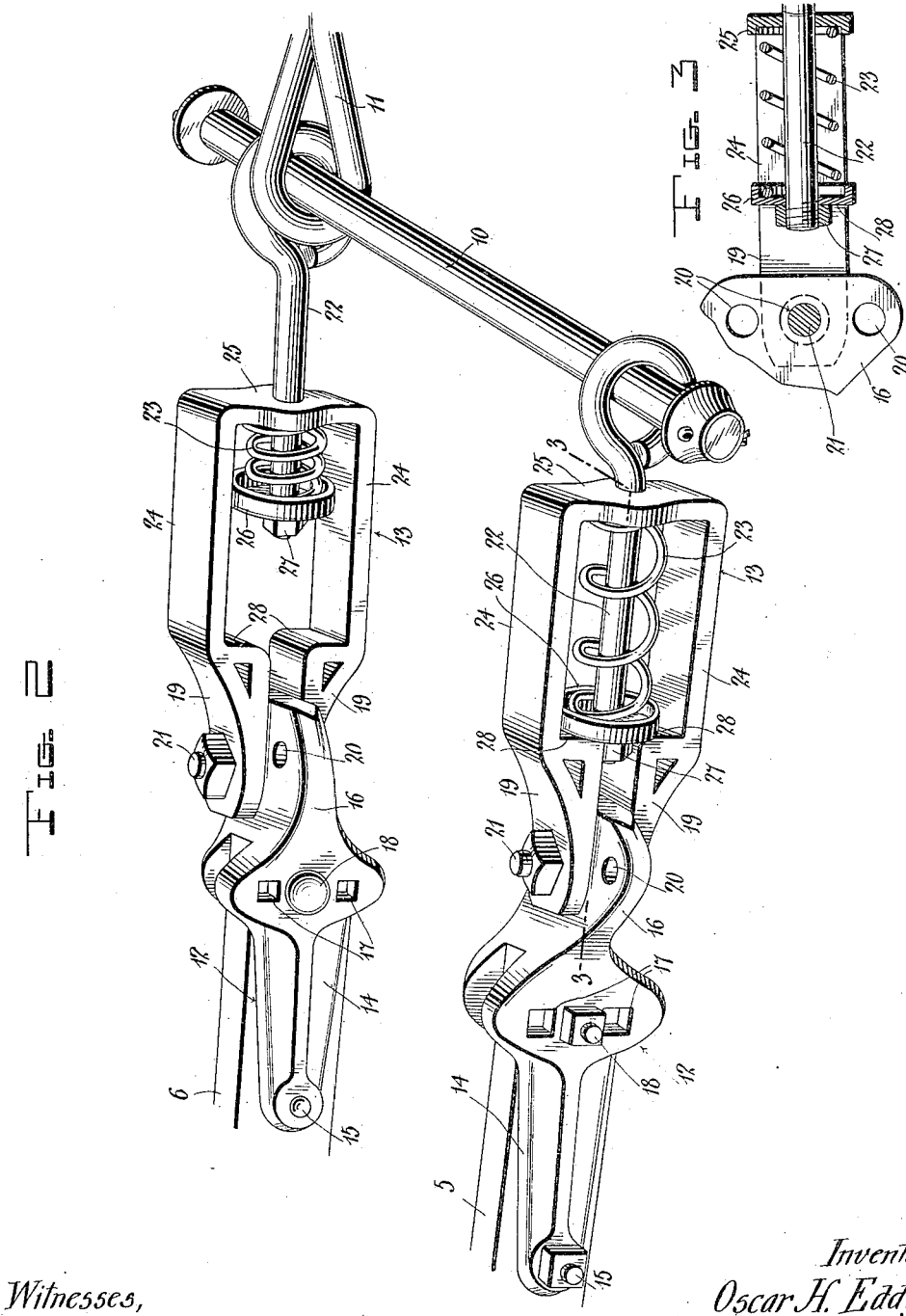

OSCAR H. EDDY, OF GREENWICH, NEW YORK, ASSIGNOR TO W. EDDY PLOW CO., OF GREENWICH, NEW YORK, A CORPORATION OF NEW YORK.

CLEVIS CONSTRUCTION.

1,126,427.  Specification of Letters Patent.  Patented Jan. 26, 1915.

Application filed June 19, 1912. Serial No. 704,645.

*To all whom it may concern:*

Be it known that I, OSCAR H. EDDY, a citizen of the United States, residing at Greenwich, in the county of Washington and State of New York, have invented new and useful Improvements in Clevis Constructions, of which the following is a specification.

The present invention relates to clevis constructions, and it comprehends, briefly, an improved clevis which is especially designed for attachment to two-way riding or sulky plows to maintain the line of draft in proper position at all times with reference to the particular plow in use.

An embodiment of the invention is illustrated in the accompanying drawing, whereof—

Figure 1 is a side elevation of a two-way sulky plow equipped with the improved clevis; Fig. 2 is an enlarged perspective view of the clevis; and Fig. 3 is a horizontal section on the line 3—3 of Fig. 2.

In operating a two-way sulky or riding plow, the front end of the beam of the plow which is then being used, (hereinafter termed the "working" plow, as opposed to the other or "idle" plow), is depressed slightly below the corresponding end of the beam of the idle plow when level ground is being plowed, whereby the rod which connects the front ends of the two beams is disposed at an angle to the horizontal; this inclination of the connecting rod causes the whiffletree hook carried thereby to slide toward the beam of the working plow, thus maintaining the line of draft in correct position relative to that beam. On the other hand, where the furrow is being turned upon a hillside, the connecting rod often occupies an approximately horizontal position, and if the working plow strikes against a stone or the like the hook slides toward the beam of the idle plow and remains adjacent the same until moved back manually to its proper position and the tension is relieved. During the time that the hook occupies a position adjacent the beam of the idle plow, the line of draft is correspondingly changed, with the result that the effective operation of the working plow is impaired, as will be understood. To overcome this defect, it is proposed to connect the aforesaid rod to the beams in such a manner and by such means as to insure the retention of the hook at all times in position relative to the beam of the working plow, irrespective of which plow is being used, and, also, of the position of the plow beams relative to each other. These features constitute the subject matter of the present case, and will be fully explained and described hereinafter, and pointed out in the appended claims.

Referring more particularly to the drawings, 5 and 6 indicate, respectively, the right- and left-hand beams of a two-way sulky plow, and 7 and 8 the corresponding shares connected thereto. These parts may have any preferred or conventional construction, and, hence, require no extended description, and it may also be stated that any suitable lever system 9 or the like may be provided for depressing the front end of the beam carrying the particular share which it is desired to use.

Each beam is provided at its front terminal with a clevis of the type hereinafter described, the two clevises being connected by the rod 10, upon which, in turn, is slidably mounted the whiffletree hook 11. As shown in Fig. 2, each clevis preferably consists of a fixed member 12 and a movable member 13, the first-mentioned member being formed with a forked rear portion 14 which straddles and is fastened to the beam end by a bolt 15 and with a wide flat front portion 16 which occupies a plane at right angles to that of the fork legs, while the inner ends of the said fork legs are also enlarged or widened and are formed with vertical series of registering openings 17 in which the front fastening bolt 18 is interchangeably engaged, this construction allowing of a vertical adjustment of the members in question.

The front clevis members 13 are designed for swinging movement and, also, a limited adjustment horizontally, relative to the rear members, to which end their rear portions 19 are forked, as shown, and straddle the flat forward portions or tongues 16, the latter being formed, each, with a transversely-arranged series of perforations 20 through which the connecting pivot bolt 21 is interchangeably passed. These members have an extensible connection with rod 10, to permit the same to vary its position with respect thereto. In the present embodiment of the invention, spring-controlled devices are employed for the purpose indicated, such devices enabling the rod to assume an angular position with respect to the clevis members, under the influence of the draft. Said devices are here shown as comprising eyebolts 22, through whose eye portions the connecting rod is loosely passed, the stems of the bolts being encircled by expansible coil springs 23 disposed within the confines of the front portions 24 of the clevis members, which portions are preferably constructed as skeleton or open rectangular housings formed at their rear sides with the forked extensions 19. The front sides of these housing are slightly widened and are formed at their vertical edges with in-turned flanges 25 that serve to produce seats for the forward end of the springs, the seats being provided, in turn, with central perforations through which the bolt stems slide. The rear ends of the springs bear against flanged or seated washers 26 which are held by the pressure of the springs against terminal nuts 27 carried by the bolt stems.

The front clevis members 13, which, as already stated, comprise the housings 24 and the forked extensions 19, are preferably constructed of malleable metal, the spaces between the fork legs opening into the housings and producing, in consequence, pairs of shoulders 28, against which the washers 26 are normally held by the springs. These spaces are disposed in alinement with the eye bolts 22, so as to normally receive the nuts 27, and are sufficiently long to prevent the latter from contacting with the ends of the tongues 16, thus precluding interference of the parts with each other during adjustment.

When the plow is in operation, the depressed front end of the beam of the working share causes the connecting rod 10 to become slightly inclined to the horizontal, with the result that the whiffletree hook 11 at once slides toward the lower rod end and into contact with the eye of the adjacent bolt. The draft exerted upon the hook and rod will then be transmitted directly to that bolt, and by reason of the extensible connection between the latter and the adjacent housing, will cause the bolt to move forwardly and the rod to form an acute angle with said bolt, with the hook located at the downwardly directed apex of the said angle, in which position the hook will be held until the end of the furrow is reached and the beam raised. When the other beam is subsequently lowered, the operation will be the reverse of that above described, the hook being held at the opposite end of the rod and in contact with the eye of the other bolt. These two positions of the hook are represented in Figs. 1 and 2, the right-hand beam being depressed in the first figure, and the left-hand beam in the second figure. It will be seen, therefore, that by providing the extensible connections between the ends of the rod and the corresponding clevises the rod will be drawn away at one end from the adjacent clevis, (according to whichever beam is depressed), and forced to assume a position at an acute angle to the bolt associated with that clevis, the tension exerted by the draft upon the hook forcing the latter to remain in position at the apex of the angle. In this way, the line of draft is maintained automatically in proper position at all times with relation to the particular plow that is being used.

I claim as my invention:

1. The combination, with a two-way plow including a pair of separate beams each provided at its front end with a clevis, of a rod having an extensible spring-controlled connection at each end with the adjacent clevis, and a whiffletree hook slidable upon said rod toward either of such connections, to extend the same and draw the adjacent end of the rod forwardly away from the corresponding clevis, whereby said rod is caused to form an acute angle with the extended connection, and said hook is held by the draft exerted thereupon at the apex of said angle.

2. The combination, with a two-way plow including a pair of separate beams, and means for depressing the front end of either beam, of a clevis connected to the front end of each beam, a spring-controlled eye bolt carried by each clevis and disposed longitudinally of the same, a rod having its ends engaged with the eyes of said bolts, said rod being arranged to assume a position inclined to the horizontal when the end of either beam is depressed, and a whiffletree hook slidable upon said rod toward the depressed end thereof and into engagement with the adjacent bolt, to draw that bolt outwardly of its clevis and the end of said rod away from said clevis, whereby said rod is caused to form an acute angle with the outwardly-moved bolt, with the apex of said angle directed downward, and said hook is maintained at said apex.

In testimony whereof I have hereunto set my hand in presence of two subscribing witnesses.

OSCAR H. EDDY.

Witnesses:
JAMES RICHARD SKINNER,
MICHAEL SONN.

Copies of this patent may be obtained for five cents each, by addressing the "Commissioner of Patents, Washington, D. C."